United States Patent
Gao et al.

(10) Patent No.: US 12,225,513 B2
(45) Date of Patent: Feb. 11, 2025

(54) COMMUNICATIONS METHOD AND APPARATUS

(71) Applicant: Huawei Technologies Co., Ltd., Shenzhen (CN)

(72) Inventors: Lei Gao, Beijing (CN); Jiezuo Zhu, Beijing (CN); Sha Ma, Beijing (CN); Changqing Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 292 days.

(21) Appl. No.: 17/890,719

(22) Filed: Aug. 18, 2022

(65) Prior Publication Data

US 2022/0400486 A1    Dec. 15, 2022

Related U.S. Application Data

(63) Continuation of application No. PCT/CN2020/087768, filed on Apr. 29, 2020.

(30) Foreign Application Priority Data

Feb. 19, 2020  (WO) ................ PCT/CN2020/075894

(51) Int. Cl.
H04W 72/0446 (2023.01)
H04L 1/00 (2006.01)
(Continued)

(52) U.S. Cl.
CPC ....... *H04W 72/0446* (2013.01); *H04L 1/0026* (2013.01); *H04L 27/2607* (2013.01); *H04W 4/48* (2018.02)

(58) Field of Classification Search
CPC .. H04W 72/0446; H04W 4/48; H04L 1/0026; H04L 27/2607; H04L 5/0078
See application file for complete search history.

(56) References Cited

U.S. PATENT DOCUMENTS

| 2019/0165891 | A1 | 5/2019 | Iwai et al. |
| 2019/0327020 | A1* | 10/2019 | Gao .................... H04W 72/23 |
| 2020/0037294 | A1 | 1/2020 | Ma et al. |

FOREIGN PATENT DOCUMENTS

| CN | 106255213 A | 12/2016 |
| CN | 107371251 A | 11/2017 |

(Continued)

OTHER PUBLICATIONS

"Part 11: Wireless LAN Medium Access Control (MAC) and Physical Layer (PHY) Specifications," IEEE Std 802.11-2016, IEEE Standard for Information technology—Telecommunications and information exchange between systems Local and metropolitan area networks—Specific requirements, Approved Dec. 7, 2016, 3534 pages.

(Continued)

*Primary Examiner* — Kyaw Z Soe
(74) *Attorney, Agent, or Firm* — Conley Rose, P.C.

(57) ABSTRACT

A communications method includes a first communications device that communicates a first signal on a first time domain resource in a first time unit, communicates a second signal on a third time domain resource in a second time unit, communicates a fourth signal on a second time domain resource in the first time unit, and communicates a third signal on a fourth time domain resource in the second time unit. The first time unit successively includes, in time domain, the first time domain resource, a first guard period, the second time domain resource, and a second guard period that are consecutive in time domain, and the second time unit successively includes, in time domain, the third time domain resource, a third guard period, the fourth time domain resource, and a fourth guard period that are consecutive in time domain.

21 Claims, 8 Drawing Sheets

(51) Int. Cl.
*H04L 27/26* (2006.01)
*H04W 4/48* (2018.01)

(56) References Cited

FOREIGN PATENT DOCUMENTS

| | | | |
|---|---|---|---|
| CN | 107889251 | A | 4/2018 |
| CN | 108633015 | A | 10/2018 |
| CN | 108811120 | A | 11/2018 |
| CN | 108886778 | A | 11/2018 |
| CN | 109792328 | A | 5/2019 |
| CN | 109792701 | A | 5/2019 |
| CN | 110178319 | A | 8/2019 |
| WO | 2014110759 | A1 | 7/2014 |

OTHER PUBLICATIONS

ZTE, "Remaining issues on common aspects to support TDD NB-IoT," R1-1806201, 3GPP TSG RAN WG1 Meeting #93, May 11, 2018, 5 pages.
Dahlman Erik et al: "5G NR The Next Generation Wireless Access Technology", Aug. 17, 2018, XP055775576, 400 pages.

\* cited by examiner

Pattern 1

Pattern 2

Communications device 7

Communications device 8

Communications device 9

COMMUNICATIONS METHOD AND APPARATUS

CROSS-REFERENCE TO RELATED APPLICATIONS

This is a continuation of International Patent Application No. PCT/CN2020/087768 filed on Apr. 29, 2020, which claims priority to International Patent Application No. PCT/CN2020/075894 filed on Feb. 19, 2020. The disclosures of the aforementioned applications are hereby incorporated by reference in their entireties.

TECHNICAL FIELD

This disclosure relates to the field of wireless communications technologies, and in particular, to a communications method and apparatus, and a system, and is particularly applicable to short-range wireless communication, for example, cockpit domain communication.

BACKGROUND

Global communications technologies are developing rapidly. Development speeds and application fields of wireless communications technologies have surpassed those of wired communications technologies, showing a vigorous development tendency. For example, development and application of in-vehicle communications technologies have attracted more attention. Compared with existing wired communication, in-vehicle wireless communication can further reduce a quantity of harnesses inside a vehicle, and lengths, weights, and corresponding installation, maintenance, and maintenance costs of the line beams. Therefore, the in-vehicle communications technologies show a wireless tendency. Diversification of in-vehicle applications leads to increasingly large quantities of in-vehicle communications nodes and types thereof, and imposes a higher requirement on an in-vehicle communication capability.

In many wireless communication scenarios, a plurality of communications nodes communicate with each other using a communications domain. There may be one or more communications domains in a specific communications area or range. The communications domain is a system including a group of communications nodes that have a communications relationship, and the communications connection relationship (that is, a communications link) between the communications nodes. One communications domain includes one primary communications node (or a master node) and at least one secondary communications node (or a slave node). The master node manages a time-frequency resource of the communications domain, and has a function of scheduling a resource for a communications link between the master node and the slave node.

How to use a resource to implement stable service transmission becomes an urgent problem to be resolved.

SUMMARY

Embodiments of this disclosure provide a communications method and apparatus, to implement stable transmission of a service.

According to a first aspect, a communications method is provided, and is used for signal transmission between a slave node and a master node. The method is performed by the slave node, or the method may be performed by a chip or an integrated circuit configured on the slave node. This is not limited in this disclosure. The master node manages the slave node, has a function of allocating resources, and is responsible for allocating resources to the slave node. The slave node listens to scheduling of the master node and communicates with the master node using the resources allocated by the master node. The method includes communicating a first signal with a first communications device on a first time domain resource in a first time unit, communicating a second signal with the first communications device on a third time domain resource in a second time unit, where the first time unit and the second time unit have a same time length, the first time unit successively includes, in time domain, the first time domain resource, a first guard period (GP), a second time domain resource, and a second guard period that are consecutive in time domain, and the second time unit successively includes, in time domain, the third time domain resource, a third guard period, a fourth time domain resource, and a fourth guard period that are consecutive in time domain.

In embodiments of this disclosure, the first communications device may be the master node. Communicating a first signal with a first communications device may be receiving the first signal from the first communications device or sending the first signal to the first communications device. When communicating a first signal with the first communications device is receiving the first signal from the first communications device, communicating a second signal with the first communications device is receiving the second signal from the first communications device. When communicating a first signal with the first communications device is sending the first signal to the first communications device, communicating a second signal with the first communications device is sending the second signal to the first communications device. The first signal and the second signal each may be a service signal.

In embodiments of this disclosure, the first time unit and the second time unit each may be a transmission granularity, a scheduling unit, or another scheduling granularity such as one subframe, one frame, one slot, or one mini-slot of a service. The first time unit is consecutive time domain resources in time domain, and the second time unit is consecutive time domain resources in time domain. A time length of the first time unit and a time length of the second time unit may be predefined.

In embodiments of this disclosure, the first GP and the second GP are set in the first time unit, and the third GP and the fourth GP are set in the second time unit. The first GP, the second GP, the third GP, and the fourth GP may be used by the master node and the slave node to perform receive-to-transmit conversion or transmit-to-receive conversion, to prevent signal sending or receiving from being affected because transmit power or a receive gain is unstable in a conversion process. This improves service transmission quality.

In a possible implementation, the first time domain resource and the third time domain resource are used to map signals from the first communications device, and the second time domain resource and the fourth time domain resource are used to map signals sent to the first communications device. Alternatively, the first time domain resource and the third time domain resource are used to map signals sent to the first communications device, and the second time domain resource and the fourth time domain resource are used to map signals from the first communications device. Herein, the signal from the first communications device may also be referred to as a signal for downlink transmission, and the signal sent to the first communications device may also be referred to as a signal for uplink transmission.

In this manner, the first GP and the second GP are set in the first time unit, where the first GP is located between the first time domain resource and the second time domain resource, and a signal transmission direction on the first time domain resource is different from that on the second time domain resource. The master node and the slave node may perform receive-to-transmit conversion or transmit-to-receive conversion in the first GP. Particularly, when a time occupied by the first time unit is relatively short, a specific time may be reserved for the master node and the slave node to complete receive-to-transmit conversion or transmit-to-receive conversion, to improve signal transmission performance. Similarly, the second GP is located after the second time domain resource. When a signal transmission direction on a time domain resource after the second GP is different from that on the second time domain resource, the second GP may also complete a function the same as that of the first GP. Functions of the third GP and the fourth GP in the second time unit are the same as those of the first GP and the second GP. In addition, the first time unit and the second time unit each include a resource used for uplink transmission and a resource used for downlink transmission. Therefore, delays of both the uplink transmission and the downlink transmission can be less than a length of one time unit, so that low-delay signal transmission can be implemented.

In a possible implementation, the first time domain resource includes a first sub-time domain resource and a second sub-time domain resource. The communicating a first signal with a first communications device on a first time domain resource in a first time unit includes communicating the first signal with the first communications device on the first sub-time domain resource.

In a possible implementation, the fourth time domain resource includes a third sub-time domain resource and a fourth sub-time domain resource, and the third sub-time domain resource is used to map a second target signal.

In a possible implementation, the second sub-time domain resource is used to map a first target signal, and the first target signal is different from the first signal, and/or the fourth sub-time domain resource is used to map a third signal, and the second target signal is different from the third signal.

The first time domain resource is divided into the first sub-time domain resource and the second sub-time domain resource, the first signal is communicated on the first sub-time domain resource, and the second sub-time domain resource is used to map the first target signal that is different from the first signal, so that different signals can be communicated on the first time resource. The first sub-time domain resource and the second sub-time domain resource are obtained through division, so that the second sub-time domain resource can be used to map the first target signal, and the first sub-time domain resource can be used to communicate the first signal. The mapping of the first target signal does not occupy the first sub-time domain resource, so that transmission of the first signal can be ensured. Similarly, the fourth time domain resource is divided into the third sub-time domain resource and the fourth sub-time domain resource, so that the third sub-time domain resource is used to map the second target signal, and the fourth sub-time domain resource is used to map the third signal. The mapping of the second target signal does not occupy the fourth sub-time domain resource, so that transmission of the third signal can be ensured. In addition, a signal transmission direction on the second sub-time domain resource is different from that on the third sub-time domain resource. Therefore, different time units may be used to map the target signal in different transmission directions.

In a possible implementation, a length of the first sub-time domain resource is the same as a length of the third time domain resource, and/or a length of the second time domain resource is the same as a length of the fourth sub-time domain resource. Lengths of resources used to communicate service signals in a same direction in different time units are the same, so that quantities of available resources used for uplink and downlink transmission services can be ensured to be stable.

In a possible implementation, the first sub-time domain resource is located before the second sub-time domain resource in time domain, and the second sub-time domain resource is adjacent to the first guard period, and/or the third sub-time domain resource is located before the fourth sub-time domain resource in time domain, and the third sub-time domain resource is adjacent to the third guard period.

In a possible implementation, the target signal is at least one of higher layer signaling and physical layer signaling. Alternatively, the target signal is used for channel quality detection, synchronization, channel estimation, or phase tracking. The target signal may be communicated on the second sub-time domain resource or the third sub-time domain resource, so that service signal transmission on the first sub-time domain resource and the fourth sub-time domain resource is not affected.

In a possible implementation, target data carried in the first signal and target data carried in the first target signal belong to different services, and/or target data carried in the third signal and target data carried in the second target signal belong to different services. Alternatively, the signal carried in the first target signal and the signal carried in the second target signal may also be service signals. The target data carried in the first target signal and the target data carried in the first signal belong to different services, and the target data carried in the second target signal and the target data carried in the third signal belong to different services. Therefore, transmission of the first signal and the third signal is not affected.

In a possible implementation, the target data carried in the first signal and target data carried in the second signal belong to a same service. Data of a same service may be carried on resources in a plurality of time units.

In a possible implementation, a length of the second sub-time domain resource and a length of the third sub-time domain resource each are one symbol. In a time unit, a resource used to communicate the target signal occupies only one symbol. Therefore, more resources are used to communicate the service signals, and stability of service signal transmission can be improved. In the first time unit and the second time unit, transmission directions of the target signal are different, for example, uplink transmission and downlink transmission. Only one symbol in each time unit may be used to communicate the target signal.

According to a second aspect, a communications method is provided, and is performed by a slave node, or the method may be performed by a chip or an integrated circuit configured on the slave node. This is not limited in this disclosure. A master node manages the slave node, has a function of allocating resources, and is responsible for allocating resources to the slave node. The slave node is scheduled by the master node to communicate with the master node using the resources allocated by the master node. The method includes communicating a fourth signal with a first communications device on a second time domain resource in a first time unit, and communicating a third signal with the first communications device on a fourth time domain resource in a second time unit, where the first time unit and the second time unit have a same time length, the first time unit successively includes, in time domain, a first time domain resource, a first guard period, the second time domain resource, and a second guard period that are consecutive in time domain, and the second time unit successively includes, in time domain, a third time domain resource, a third guard period, the fourth time domain resource, and a fourth guard period that are consecutive in time domain.

In a possible implementation, the first time domain resource and the third time domain resource are used to map signals from the first communications device, and the second time domain resource and the fourth time domain resource are used to map signals sent to the first communications device. Alternatively, the first time domain resource and the third time domain resource are used to map signals sent to the first communications device, and the second time domain resource and the fourth time domain resource are used to map signals from the first communications device.

In a possible implementation, the fourth time domain resource includes a third sub-time domain resource and a fourth sub-time domain resource. Communicating a third signal with the first communications device on a fourth time domain resource in a second time unit includes communicating the third signal with the first communications device on the fourth sub-time domain resource.

In a possible implementation, the first time domain resource includes a first sub-time domain resource and a second sub-time domain resource, and the second sub-time domain resource is used to map a first target signal.

In a possible implementation, the first sub-time domain resource is used to map a first signal, and the first target signal is different from the first signal, and/or the third sub-time domain resource is used to map a second target signal, and the second target signal is different from the third signal.

In a possible implementation, a length of the first sub-time domain resource is the same as a length of the third time domain resource, and/or a length of the second time domain resource is the same as a length of the fourth sub-time domain resource.

In a possible implementation, the first sub-time domain resource is located before the second sub-time domain resource in time domain, and the second sub-time domain resource is adjacent to the first guard period, and/or the third sub-time domain resource is located before the fourth sub-time domain resource in time domain, and the third sub-time domain resource is adjacent to the third guard period.

In a possible implementation, the target signal is at least one of higher layer signaling and physical layer signaling. Alternatively, the target signal is used for channel quality detection, synchronization, channel estimation, or phase tracking.

In a possible implementation, target data carried in the first signal and target data carried in the first target signal belong to different services, and/or target data carried in the third signal and target data carried in the second target signal belong to different services.

In a possible implementation, the target data carried in the third signal and target data carried in the fourth signal belong to a same service.

In a possible implementation, a length of the second sub-time domain resource and a length of the third sub-time domain resource each are one symbol.

For technical effects brought by the second aspect or the possible implementations of the second aspect, refer to the descriptions of the technical effects of the first aspect or the implementations of the first aspect. Details are not described again.

According to a third aspect, a communications method is provided, and is performed by a master node, or the method may be performed by a chip or an integrated circuit configured on the master node. This is not limited in this disclosure. The master node manages a slave node, has a function of allocating resources, and is responsible for allocating resources to the slave node. The slave node is scheduled by the master node to communicate with the master node using the resources allocated by the master node. The method includes a first communications device communicates a first signal on a first time domain resource in a first time unit. The first communications device communicates a second signal on a third time domain resource in a second time unit. The first communications device communicates a fourth signal on a second time domain resource in the first time unit. The first communications device communicates a third signal on a fourth time domain resource in the second time unit. The first time unit and the second time unit have a same time length. The first time unit successively includes, in time domain, the first time domain resource, a first guard period, the second time domain resource, and a second guard period that are consecutive in time domain, and the second time unit successively includes, in time domain, the third time domain resource, a third guard period, the fourth time domain resource, and a fourth guard period that are consecutive in time domain.

In a possible implementation, the first time domain resource and the third time domain resource are used to map signals sent by the first communications device, and the second time domain resource and the fourth time domain resource are used to map signals received by the first communications device. Alternatively, the first time domain resource and the third time domain resource are used to map signals received by the first communications device, and the second time domain resource and the fourth time domain resource are used to map signals sent by the first communications device.

In a possible implementation, the first time domain resource includes a first sub-time domain resource and a second sub-time domain resource. That a first communications device communicates a first signal on a first time domain resource in a first time unit includes that the first communications device communicates the first signal on the first sub-time domain resource.

In a possible implementation, the fourth time domain resource includes a third sub-time domain resource and a fourth sub-time domain resource. That the first communications device communicates a third signal on a fourth time domain resource in the second time unit includes that the first communications device communicates the third signal on the fourth sub-time domain resource.

In a possible implementation, the second sub-time domain resource is used to map a first target signal, and the first target signal is different from the first signal, and/or the third sub-time domain resource is used to map a second target signal, and the second target signal is different from the third signal.

In a possible implementation, a length of the first sub-time domain resource is the same as a length of the third time domain resource, and/or a length of the second time domain resource is the same as a length of the fourth sub-time domain resource.

In a possible implementation, the first sub-time domain resource is located before the second sub-time domain resource in time domain, and the second sub-time domain resource is adjacent to the first guard period, and/or the third sub-time domain resource is located before the fourth sub-time domain resource in time domain, and the third sub-time domain resource is adjacent to the third guard period.

In a possible implementation, the target signal is at least one of higher layer signaling and physical layer signaling. Alternatively, the target signal is used for channel quality detection, synchronization, channel estimation, or phase tracking.

In a possible implementation, target data carried in the first signal and target data carried in the first target signal belong to different services, and/or target data carried in the third signal and target data carried in the second target signal belong to different services.

In a possible implementation, the target data carried in the first signal and target data carried in the second signal belong to a same service, and the target data carried in the third signal and target data carried in the fourth signal belong to a same service.

In a possible implementation, a length of the second sub-time domain resource and a length of the third sub-time domain resource each are one symbol.

For technical effects brought by the third aspect or the implementations of the third aspect, refer to the descriptions of the technical effects of the first aspect or the implementations of the first aspect. Details are not described again.

According to a fourth aspect, a communications device is provided, including a transmission module, where the transmission module is configured to communicate a first signal with a first communications device on a first time domain resource in a first time unit, and the transmission module is further configured to communicate a second signal with the first communications device on a third time domain resource in a second time unit, where the first time unit and the second time unit have a same time length, the first time unit successively includes, in time domain, the first time domain resource, a first guard period, a second time domain resource, and a second guard period that are consecutive in time domain, and the second time unit successively includes, in time domain, the third time domain resource, a third guard period, a fourth time domain resource, and a fourth guard period that are consecutive in time domain.

In a possible implementation, the first time domain resource and the third time domain resource are used to map signals from the first communications device, and the second time domain resource and the fourth time domain resource are used to map signals sent to the first communications device. Alternatively, the first time domain resource and the third time domain resource are used to map signals sent to the first communications device, and the second time domain resource and the fourth time domain resource are used to map signals from the first communications device.

In a possible implementation, the first time domain resource includes a first sub-time domain resource and a second sub-time domain resource. That the transmission module is configured to communicate a first signal with a first communications device on a first time domain resource in a first time unit includes that the transmission module is configured to communicate the first signal with the first communications device on the first sub-time domain resource.

In a possible implementation, the fourth time domain resource includes a third sub-time domain resource and a fourth sub-time domain resource, and the third sub-time domain resource is used to map a second target signal.

In a possible implementation, the second sub-time domain resource is used to map a first target signal, and the first target signal is different from the first signal, and/or the fourth sub-time domain resource is used to map a third signal, and the second target signal is different from the third signal.

In a possible implementation, a length of the first sub-time domain resource is the same as a length of the third time domain resource, and/or a length of the second time domain resource is the same as a length of the fourth sub-time domain resource.

In a possible implementation, the first sub-time domain resource is located before the second sub-time domain resource in time domain, and the second sub-time domain resource is adjacent to the first guard period, and/or the third sub-time domain resource is located before the fourth sub-time domain resource in time domain, and the third sub-time domain resource is adjacent to the third guard period.

In a possible implementation, the target signal is at least one of higher layer signaling and physical layer signaling. Alternatively, the target signal is used for channel quality detection, synchronization, channel estimation, or phase tracking.

In a possible implementation, target data carried in the first signal and target data carried in the first target signal belong to different services, and/or target data carried in the third signal and target data carried in the second target signal belong to different services.

In a possible implementation, the target data carried in the first signal and target data carried in the second signal belong to a same service.

In a possible implementation, a length of the second sub-time domain resource and a length of the third sub-time domain resource each are one symbol.

For technical effects brought by the fourth aspect or the implementations of the fourth aspect, refer to the descriptions of the technical effects of the first aspect or the implementations of the first aspect. Details are not described again.

According to a fifth aspect, a communications device is provided, including a transmission module, where the transmission module is configured to communicate a fourth signal with a first communications device on a second time domain resource in a first time unit, and the transmission module is further configured to communicate a third signal with the first communications device on a fourth time domain resource in a second time unit, where the first time unit and the second time unit have a same time length, the first time unit successively includes, in time domain, a first time domain resource, a first guard period, the second time domain resource, and a second guard period that are consecutive in time domain, and the second time unit successively includes, in time domain, a third time domain resource, a third guard period, the fourth time domain resource, and a fourth guard period that are consecutive in time domain.

In a possible implementation, the first time domain resource and the third time domain resource are used to map signals from the first communications device, and the second time domain resource and the fourth time domain resource are used to map signals sent to the first communications device. Alternatively, the first time domain resource and the third time domain resource are used to map signals sent to the first communications device, and the second time domain resource and the fourth time domain resource are used to map signals from the first communications device.

In a possible implementation, the fourth time domain resource includes a third sub-time domain resource and a fourth sub-time domain resource. That the transmission module communicates a third signal to the first communications device on a fourth time domain resource in a second time unit includes that the transmission module communicates the third signal to the first communications device on the fourth sub-time domain resource.

In a possible implementation, the first time domain resource includes a first sub-time domain resource and a second sub-time domain resource, and the second sub-time domain resource is used to map a first target signal.

In a possible implementation, the first sub-time domain resource is used to map a first signal, and the first target signal is different from the first signal, and/or the third sub-time domain resource is used to map a second target signal, and the second target signal is different from the third signal.

In a possible implementation, a length of the first sub-time domain resource is the same as a length of the third time domain resource, and/or a length of the second time domain resource is the same as a length of the fourth sub-time domain resource.

In a possible implementation, the first sub-time domain resource is located before the second sub-time domain resource in time domain, and the second sub-time domain resource is adjacent to the first guard period, and/or the third sub-time domain resource is located before the fourth sub-time domain resource in time domain, and the third sub-time domain resource is adjacent to the third guard period.

In a possible implementation, the target signal is at least one of higher layer signaling and physical layer signaling. Alternatively, the target signal is used for channel quality detection, synchronization, channel estimation, or phase tracking.

In a possible implementation, target data carried in the first signal and target data carried in the first target signal belong to different services, and/or target data carried in the third signal and target data carried in the second target signal belong to different services.

In a possible implementation, the target data carried in the third signal and target data carried in the fourth signal belong to a same service.

In a possible implementation, a length of the second sub-time domain resource and a length of the third sub-time domain resource each are one symbol.

For technical effects brought by the fifth aspect or the implementations of the fifth aspect, refer to the descriptions of the technical effects of the first aspect or the implementations of the first aspect. Details are not described again.

According to a sixth aspect, a communications device is provided, including a transmission module configured to communicate a first signal on a first time domain resource in a first time unit, where the transmission module is further configured to communicate a second signal on a third time domain resource in a second time unit, the transmission module is further configured to communicate a fourth signal on a second time domain resource in the first time unit, and the transmission module is further configured to communicate a third signal on a fourth time domain resource in the second time unit, where the first time unit and the second time unit have a same time length, the first time unit successively includes, in time domain, the first time domain resource, a first guard period, the second time domain resource, and a second guard period that are consecutive in time domain, and the second time unit successively includes, in time domain, the third time domain resource, a third guard period, the fourth time domain resource, and a fourth guard period that are consecutive in time domain.

In a possible implementation, the first time domain resource and the third time domain resource are used to map signals sent by the transmission module, and the second time domain resource and the fourth time domain resource are used to map signals received by the transmission module. Alternatively, the first time domain resource and the third time domain resource are used to map signals received by the transmission module, and the second time domain resource and the fourth time domain resource are used to map signals sent by the transmission module.

In a possible implementation, the first time domain resource includes a first sub-time domain resource and a second sub-time domain resource. That the transmission module is configured to communicate a first signal on a first time domain resource in a first time unit includes that the transmission module is configured to communicate the first signal on the first sub-time domain resource.

In a possible implementation, the fourth time domain resource includes a third sub-time domain resource and a fourth sub-time domain resource. That the transmission module is configured to communicate a third signal on a fourth time domain resource in the second time unit includes that the transmission module is configured to communicate the third signal on the fourth sub-time domain resource.

In a possible implementation, the second sub-time domain resource is used to map a first target signal, and the first target signal is different from the first signal, and/or the third sub-time domain resource is used to map a second target signal, and the second target signal is different from the third signal.

In a possible implementation, a length of the first sub-time domain resource is the same as a length of the third time domain resource, and/or a length of the second time domain resource is the same as a length of the fourth sub-time domain resource.

In a possible implementation, the first sub-time domain resource is located before the second sub-time domain resource in time domain, and the second sub-time domain resource is adjacent to the first guard period, and/or the third sub-time domain resource is located before the fourth sub-time domain resource in time domain, and the third sub-time domain resource is adjacent to the third guard period.

In a possible implementation, the target signal is at least one of higher layer signaling and physical layer signaling. Alternatively, the target signal is used for channel quality detection, synchronization, channel estimation, or phase tracking.

In a possible implementation, target data carried in the first signal and target data carried in the first target signal belong to different services, and/or target data carried in the third signal and target data carried in the second target signal belong to different services.

In a possible implementation, the target data carried in the first signal and target data carried in the second signal belong to a same service, and the target data carried in the third signal and target data carried in the fourth signal belong to a same service.

In a possible implementation, a length of the second sub-time domain resource and a length of the third sub-time domain resource each are one symbol.

For technical effects brought by the sixth aspect or the implementations of the sixth aspect, refer to the description of the technical effects of the first aspect or the implementations of the first aspect. Details are not described again.

According to a seventh aspect, a communications apparatus is provided, including a processor and a memory. The memory is configured to store one or more programs, and the one or more programs include computer executable instructions. When the apparatus runs, the processor executes the one or more programs stored in the memory, so that the apparatus performs the method according to the first aspect or the possible implementations of the first aspect.

According to an eighth aspect, a communications apparatus is provided, including a processor and a memory. The memory is configured to store one or more programs, and the one or more programs include computer executable instructions. When the apparatus runs, the processor executes the one or more programs stored in the memory, so that the apparatus performs the method according to the second aspect or the possible implementations of the second aspect.

According to a ninth aspect, a communications apparatus is provided, including a processor and a memory. The memory is configured to store one or more programs, and the one or more programs include computer-executable instructions. When the apparatus runs, the processor executes the one or more programs stored in the memory, so that the apparatus performs the method according to the third aspect or the possible implementations of the third aspect.

According to a tenth aspect, an embodiment of this disclosure further provides a computer-readable storage medium. The computer storage medium stores a computer program. When the computer program is run on a computer, the computer performs the method according to the first aspect, the second aspect, the third aspect, the implementations of the first aspect, the implementations of the second aspect, or the implementations of the third aspect.

According to an eleventh aspect, an embodiment of this disclosure further provides a computer program product. The computer program product includes a computer program. When the computer program is run on a computer, the computer performs the method according to the first aspect, the second aspect, the third aspect, the implementations of the first aspect, the implementations of the second aspect, or the implementations of the third aspect.

According to a twelfth aspect, an embodiment of this disclosure provides a chip. The chip includes a processor and a communications interface. The processor is configured to invoke instructions from the communications interface and run the instructions, and when the processor executes the instructions, the chip performs the method according to the first aspect, the second aspect, the third aspect, the implementations of the first aspect, the implementations of the second aspect, or the implementations of the third aspect.

According to a thirteenth aspect, an embodiment of this disclosure provides a system. The system includes the communications apparatus according to the fourth aspect or the seventh aspect, the communications apparatus according to the fifth aspect or the eighth aspect, the communications apparatus according to the sixth aspect or the ninth aspect, or the chip according to the twelfth aspect.

BRIEF DESCRIPTION OF DRAWINGS

To describe technical solutions in some embodiments of the present disclosure more clearly, the following briefly describes accompanying drawings describing embodiments of the present disclosure. It is clear that the accompanying drawings in the following description show only some embodiments of the present disclosure, and a person of ordinary skill in the art may still derive other drawings from these accompanying drawings without creative efforts.

DESCRIPTION OF EMBODIMENTS

Figure 1:
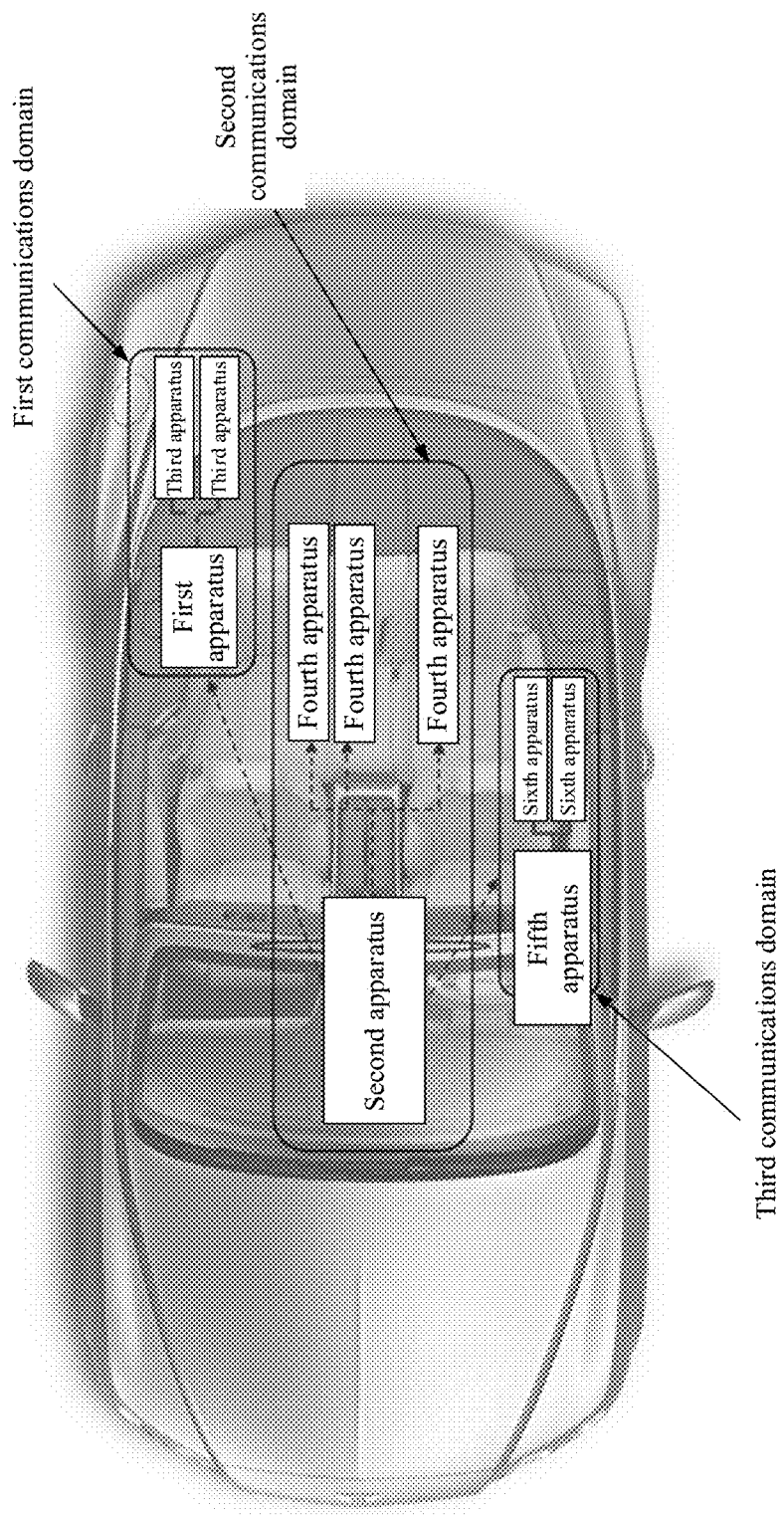
FIG. 1 is a schematic diagram of a scenario architecture of a communications method according to an embodiment of this disclosure.

In the specification, claims, and accompanying drawings of this disclosure, the terms such as "first", "second", "third", and "fourth" (if any) are intended to distinguish between similar objects but do not necessarily indicate a specific order or sequence. It should be understood that data termed in such a way is interchangeable in appropriate circumstances, so that embodiments of this disclosure described herein can be implemented in an order other than these orders illustrated or described herein. Moreover, terms such as "include", "contain", and any other variants thereof mean to cover the non-exclusive inclusion. For example, a process, a method, a system, a product, or a device that includes a list of steps or units is not necessarily limited to those expressly listed steps or units, but may include other steps or units not expressly listed or inherent to such the process, the method, the product, or the device.

A communications device in embodiments of this disclosure may be an in-vehicle device such as a cockpit domain controller, an in-vehicle speaker, or an in-vehicle microphone, or may be an electronic device such as a mobile phone, a tablet computer, a desktop computer, a laptop computer, a notebook computer, an ultra-mobile personal computer (UMPC), a handheld computer, a netbook, a personal digital assistant (PDA), a wearable electronic device, or a virtual reality device.

The following first explains some terms in this disclosure, to facilitate understanding by a person skilled in the art.

(1) Cockpit domain controller or control domain cockpit (CDC): CDC, which is referred to as a head unit. In addition to conventional radio, music and video playback, and navigation functions, the current head unit further has a cellular communication function (third generation (3G), fourth generation (4G), or the like), and can implement human-to-vehicle information communication and vehicle-to-outside information communication with reference to a Controller Area Network (CAN) bus technology for a vehicle. This enhances functions related to user experience, services, and security.

(2) Primary and slave nodes: There are two types of nodes in terms of a logical function, that is, a master node and a slave node. The master node manages the slave node, has a function of allocating resources, and is responsible for allocating resources to the slave node. The slave node is scheduled by the master node to communicate with the master node using the resources allocated by the master node. The node may be various apparatuses. For example, the master node is a mobile phone, and the slave node is a headset. The mobile phone establishes a communications connection to the headset to implement data exchange. The mobile phone manages the headset. The mobile phone has a function of allocating resources, and may allocate resources to the headset.

(3) Communications domain: The communications domain is a system including a group of communications nodes that have a communications relationship, and the communications connection relationship between the communications nodes. One apparatus or device may be in a plurality of communications domains. For example, when a mobile phone performs wireless communication with a headset, the mobile phone is in a communications domain a that includes the mobile phone and the headset. In the communications domain a, the mobile phone is a master node, and the headset is a slave node. Then, after the mobile phone detects a CDC and establishes a wireless connection to the CDC, the mobile phone is also in a communications domain b that includes the mobile phone and the CDC. In the communications domain b, the CDC is a master node, the mobile phone is a slave node, and the mobile phone is scheduled by the CDC. The communications domain b may further include another slave node, for example, an in-vehicle speaker or microphone.

A wireless communication scenario to which a communications method provided in embodiments of this disclosure is applied may include wide area wireless communication, for example, communication between a plurality of base stations and a plurality of user equipments (UEs). The base station is used as a master node, the UE is used as a slave node, the base station allocates resources to the UE, and the UE is scheduled by the base station. The wireless communication scenario may alternatively include an in-vehicle wireless communication scenario, for example, communication between a CDC and an in-vehicle speaker, an in-vehicle microphone, or a mobile phone, and communication between a mobile phone and a wearable device such as a headset. The wireless communication scenario may alternatively include local area wireless communication, for example, communication between a plurality of access points (APs) and a plurality of stations.

To facilitate understanding of the communications method in embodiments of this disclosure, the following uses the in-vehicle wireless communication scenario as an example for description. However, the communications method in embodiments of this disclosure is not limited to the in-vehicle communication scenario.

FIG. 1 is a schematic diagram of a scenario architecture of a communications method according to an embodiment of this disclosure. The scenario architecture may include but is not limited to a first apparatus, a second apparatus, a third apparatus, and a fourth apparatus. The first apparatus may be a mobile phone. The second apparatus may be a CDC. There may be a plurality of third apparatuses, for example, wearable devices such as a headset and a band. There may be a plurality of fourth apparatuses, for example, devices such as an in-vehicle speaker and an in-vehicle microphone. It can be learned from the foregoing descriptions that the first apparatus is different from the second apparatus. In some possible scenarios, the first apparatus and the second apparatus may be of a same type. For example, both the first apparatus and the second apparatus are CDCs, but the first apparatus and the second apparatus represent different CDCs.

The second apparatus may be a device that performs control management such as allocation and coordination of communications resources in an in-vehicle wireless communication scenario. The second apparatus establishes a communications connection to at least one fourth apparatus, to constitute a second communications domain. The first apparatus establishes a communications connection to at least one third apparatus, to constitute a first communications domain.

In a possible implementation, the scenario architecture in embodiments of this disclosure may further include a communications domain including more apparatuses, for example, a fifth apparatus and a sixth apparatus. This is not limited in this disclosure.

During actual application, in-vehicle applications are diversified, quantities of communications nodes inside a vehicle and types thereof are large, and wired communication is used in most cases. A service type in in-vehicle communication includes a noise reduction service, a dynamic service, another service, and the like. The noise reduction service includes uplink transmission and downlink transmission, and is used to cancel air noise, tire noise, and the like. The noise reduction service mainly includes ultra-small packet data, for example, data of 16 bits or 32 bits. The noise reduction service has a relatively strong periodicity and a very short periodicity. The dynamic service has a relatively small service volume, no periodicity, and a low delay requirement, and is, for example, information reporting of an operation button or reporting of an abnormal working status of a device. The other service includes a common voice/video service, web page browsing, file transfer, and the like. An amount of data in single transmission is relatively large and duration of the single transmission is relatively long. A wireless in-vehicle communications technology has requirements such as stable service resource transmission and a low delay. Therefore, how to implement stable service transmission using radio resources is an urgent problem to be resolved.

Based on this, this disclosure provides a communications method. Two guard periods are set in one time unit, and may be used by a master node and a slave node to perform receive-to-transmit conversion or transmit-to-receive conversion, to prevent signal sending or receiving from being affected because transmit power or a receive gain is unstable in a conversion process. This improves service transmission quality.

In addition, wired transmission is replaced by wireless transmission. Compared with wired transmission, wireless transmission may not use a cable, so that a weight of a vehicle body can be reduced, there is no cabling constraint, and no location needs to be reserved for cabling in the vehicle body. Therefore, vehicle production and manufacturing costs can be further effectively reduced.

The following describes in detail embodiments provided in this disclosure with reference to the accompanying drawings.

Figure 2:
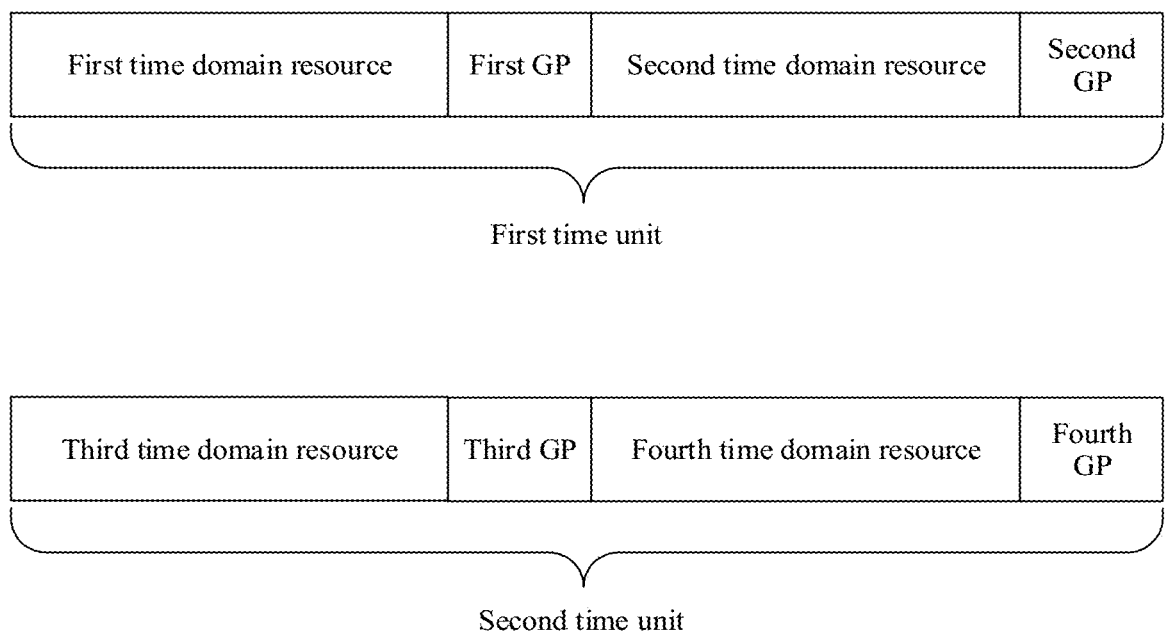
FIG. 2 is a schematic diagram of a structure of a time domain resource unit according to an embodiment of this disclosure.

FIG. 2 is a schematic diagram of a structure of a time domain resource according to an embodiment of this disclosure. As shown in FIG. 2, a first time unit successively includes, in time domain, a first time domain resource, a first GP, a second time domain resource, and a second GP. A second time unit successively includes, in time domain, a third time domain resource, a third GP, a fourth time domain resource, and a fourth GP.

A first communications device communicates a first signal on the first time domain resource, the first communications device communicates a second signal on the third time domain resource, the first communications device communicates a fourth signal on the second time domain resource, and the first communications device communicates a third signal on the fourth time domain resource. The first time unit and the second time unit have a same time length, the first time unit successively includes, in time domain, the first time domain resource, the first guard period, the second time domain resource, and the second guard period that are consecutive in time domain, and the second time unit successively includes, in time domain, the third time domain resource, the third guard period, the fourth time domain resource, and the fourth guard period that are consecutive in time domain.

Herein, the first communications device may be a master node. The following uses the master node as an example for description. An object to which the first communications device communicates the first signal is a slave node 1, an object to which the first communications device communicates the second signal is a slave node 2, an object to which the first communications device communicates the third signal is a slave node 3, and an object to which the first communications device communicates the fourth signal is a slave node 4. Herein, the slave node 1, the slave node 2, the slave node 3, and the slave node 4 may be four different slave nodes. Alternatively, the slave node 1 and the slave node 2 are a same slave node A, and the slave node 3 and the slave node 4 are a same slave node or different slave nodes. When the slave node 3 and the slave node 4 are a same slave node B, the slave node 1 and the slave node 2 are a same slave node or different slave nodes.

When the slave node 1 and the slave node 2 are a same slave node A, the slave node A communicates the first signal to the master node on the first time domain resource, and the slave node A communicates the second signal to the master node on the third time domain resource.

When the slave node 3 and the slave node 4 are a same slave node B, the slave node B communicates the fourth signal to the master node on the second time domain resource, and the slave node B communicates the third signal to the master node on the fourth time domain resource. The following uses an example in which the slave node 1 and the slave node 2 are a same slave node A, and the slave node 3 and the slave node 4 are a same slave node B for description.

That a signal is communicated on the first time domain resource, the second time domain resource, the third time domain resource, and the fourth time domain resource means that the signal is communicated on all or some of the time domain resources. The first time domain resource to the fourth time domain resource occupy at least one symbol in time domain.

The first time domain resource may be used for signal transmission between a master node and a plurality of slave nodes, and the plurality of slave nodes perform time division multiplexing and/or frequency division multiplexing on the first time domain resource. The second time domain resource to the fourth time domain resource may also have a same feature. Details are not described herein again.

The first signal to the fourth signal may be a noise reduction service of in-vehicle communication, or may be a general audio/video service, web page browsing, file transfer, or the like.

It may be understood that the first time unit and the second time unit may have a same time length or different time lengths. The first time unit and the second time unit are used for communication between the master node and the slave node. The first time unit and the second time unit may be different types of time units. The first time unit and the second time unit each may be a transmission granularity, a scheduling unit, or another scheduling granularity such as one subframe, one frame, one slot, or one mini-slot of a service.

In an optional design, time lengths of the first time unit and the second time unit may be predefined in a standard. For example, the lengths of the first time unit and the second time unit may be $1/(48$ kilohertz (kHz))$\approx 20.83$ microseconds (μs). Quantities of symbols included in the first time unit and the second time unit may also be predefined. The quantities of symbols included in the first time unit and the second time unit are not limited herein. An example in which the first time unit and the second time unit each are a frame is used below for description.

Both the first time unit and the second time unit are consecutive time domain resources in time domain. The first time unit and the second time unit may be or may not be adjacent in time domain. Another time unit may be spaced between the first time unit and the second time unit, and the other time unit may be at least one time unit with a same structure as the first time unit and/or at least one time unit with a same structure as the second time unit and/or at least one time unit with another structure. Locations of the first time unit and the second time unit are not limited herein. The first time unit and the second time unit do not overlap in time domain.

Two GPs are set in each time unit, and may be used by a master node and a slave node to perform receive-to-transmit conversion or transmit-to-receive conversion, to prevent signal sending or receiving from being affected because transmit power or a receive gain is unstable in a conversion process. This improves service transmission quality.

The master node may communicate with the slave node using one or more first time units and/or one or more second time units. In other words, the first time unit and the second time unit are different types of scheduling granularities that may be used for communication between the master node and the slave node.

Optionally, the first time unit and/or the second time unit are/is included in a first resource set. The first resource set includes at least one time unit with a same structure as the first time unit and/or at least one time unit with a same structure as the second time unit. The first resource set may be a superframe. The following uses the superframe as an example for description.

A time length of each superframe may be 1 millisecond (ms), and one superframe may include 48 time units or another quantity of time units. The time unit herein is a time unit with a same structure as the first time unit and/or a time unit with a same structure as the second time unit. The following uses the 48 time units as an example for description. For example, in the superframe, frames with even frame numbers such as 0, 2, and 4 are time units with a same structure as the first time unit, and frames with odd frame numbers such as 1, 3, and 5 are time units with a same structure as the second time unit. For another example, in the superframe, frames with frame numbers 0 to 23 are time units with a same structure as the first time unit, and frames with frame numbers 24 to 47 are time units with a same structure as the second time unit. For another example, in the superframe, frames with frame numbers 0 to 10 are time units with a same structure as the second time unit, and frames with frame numbers 11 to 47 are time units with a same structure as the first time unit.

A quantity of time units included in the first resource set, and arrangement manners and types of the time units are not limited herein.

A signal is communicated between the master node and the slave node using a superframe, and one super frame includes at least one first time unit and/or at least one second time unit. A quantity of time units included in the superframe may be preconfigured or specified in a protocol.

Optionally, the first time domain resource and the third time domain resource are used to map signals sent by the first communications device, and the second time domain resource and the fourth time domain resource are used to map signals received by the first communications device. Alternatively, the first time domain resource and the third time domain resource are used to map signals received by the first communications device, and the second time domain resource and the fourth time domain resource are used to map signals sent by the first communications device.

Figure 3:
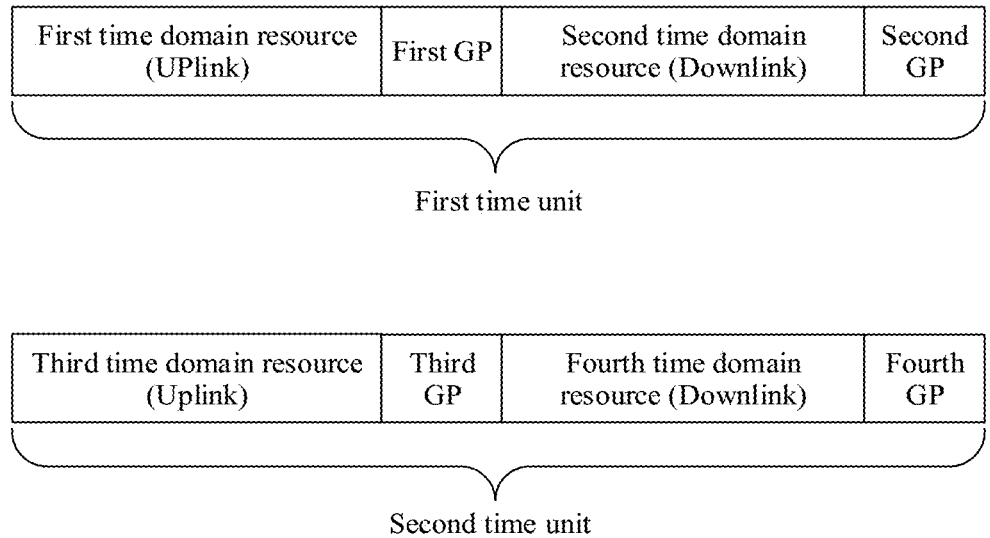
FIG. 3 is a schematic diagram of a structure of another time domain resource unit according to an embodiment of this disclosure.
Figure 3:
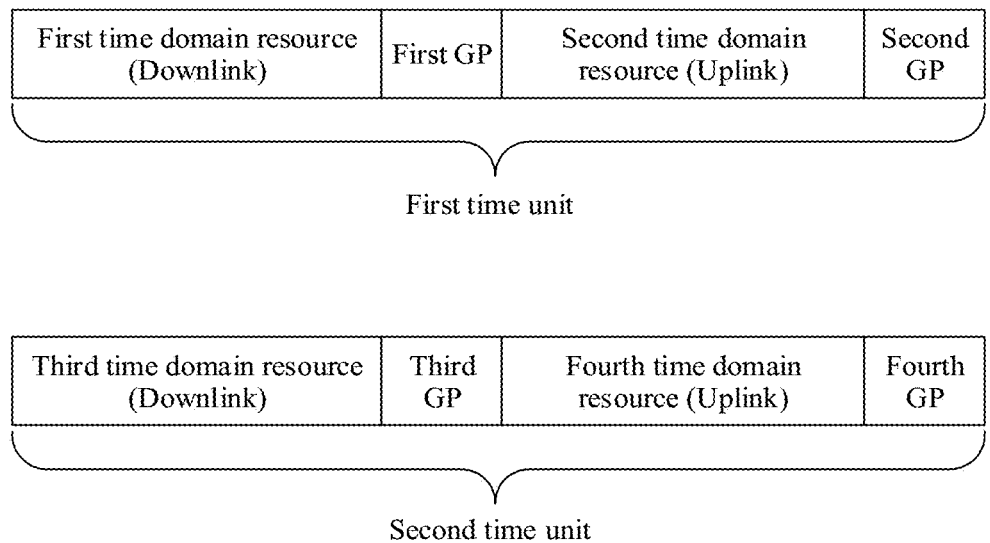

For example, in FIG. 3, there may be two patterns for the first time unit and the second time unit. As shown in a pattern 1, the first time domain resource and the third time domain resource are used for uplink transmission, and the uplink transmission means that a slave node sends a signal and a master node receives the signal. The second time domain resource and the fourth time domain resource are used for downlink transmission, and the downlink transmission means that the master node sends a signal and the slave node receives the signal. The first GP and the third GP are used by the master node to perform receive-to-transmit conversion, and the second GP and the fourth GP are used by the master node to perform transmit-to-receive conversion. When a same slave node communicates a signal on the first time domain resource and the second time domain resource, the first GP is used by the slave node to perform transmit-to-receive conversion. When a same slave node communicates a signal on the third time domain resource and the fourth time domain resource, the third GP is used by the slave node to perform transmit-to-receive conversion. When a same slave node communicates a signal on the second time domain resource and a time domain resource adjacent to the first time unit, the time domain resource adjacent to the first time unit is a time domain resource consecutive with the first time unit in time domain, and may be a time unit adjacent to the first time unit, and the second GP is used by the slave node to perform receive-to-transmit conversion. When a same slave node communicates a signal on the fourth time domain resource and a time domain resource adjacent to the second time unit, the fourth GP is used by the slave node to perform receive-to-transmit conversion. As shown in a pattern 2, the first time domain resource and the third time domain resource are used for downlink transmission, and the second time domain resource and the fourth time domain resource are used for uplink transmission. The first GP and the third GP are used by the master node to perform transmit-to-receive conversion, and the second GP and the fourth GP are used by the master node to perform receive-to-transmit conversion. Specific functions of the first GP to the fourth GP are not described herein again.

In this manner, the first GP and the second GP are set in the first time unit, where the first GP is located between the first time domain resource and the second time domain resource, and a signal transmission direction on the first time domain resource is different from that on the second time domain resource. In this way, the master node and the slave node may perform receive-to-transmit conversion or transmit-to-receive conversion in the first GP. Particularly, when a time occupied by the first time unit is relatively short, a specific time may be reserved for the master node and the slave node to complete receive-to-transmit conversion or transmit-to-receive conversion, to improve signal transmission performance. Similarly, the second GP is located after the second time domain resource. When a next time unit adjacent to the first time unit is a first time unit or a second time unit, a transmission direction on the second time domain resource is different from that on the third time domain resource or that on the first time domain resource. Therefore, the second GP may also reserve a specific time for the master node and the slave node to complete receive-to-transmit conversion or transmit-to-receive conversion, to improve signal transmission performance. Functions of the third GP and the fourth GP in the second time unit are the same as those of the first GP and the second GP.

In addition, the first time unit and the second time unit each include a resource used for uplink transmission and a resource used for downlink transmission. Therefore, delays of both the uplink transmission and the downlink transmission can be less than a length of one time unit, so that low-delay signal transmission can be implemented.

Optionally, the first time domain resource includes a first sub-time domain resource and a second sub-time domain resource. That a first communications device communicates a first signal on the first time domain resource in the first time unit includes that the first communications device communicates the first signal on the first sub-time domain resource. The fourth time domain resource includes a third sub-time domain resource and a fourth sub-time domain resource. That the first communications device communicates a third signal on the fourth time domain resource in the second time unit includes that the first communications device communicates the third signal on the fourth sub-time domain resource. The second sub-time domain resource is used to map a first target signal, and the first target signal is different from the first signal, and/or the third sub-time domain resource is used to map a second target signal, and the second target signal is different from the third signal.

Correspondingly, the slave node A communicates the first signal to the first communications device on the first sub-time domain resource. The slave node B communicates the third signal to the first communications device on the fourth sub-time domain resource.

Figure 4:
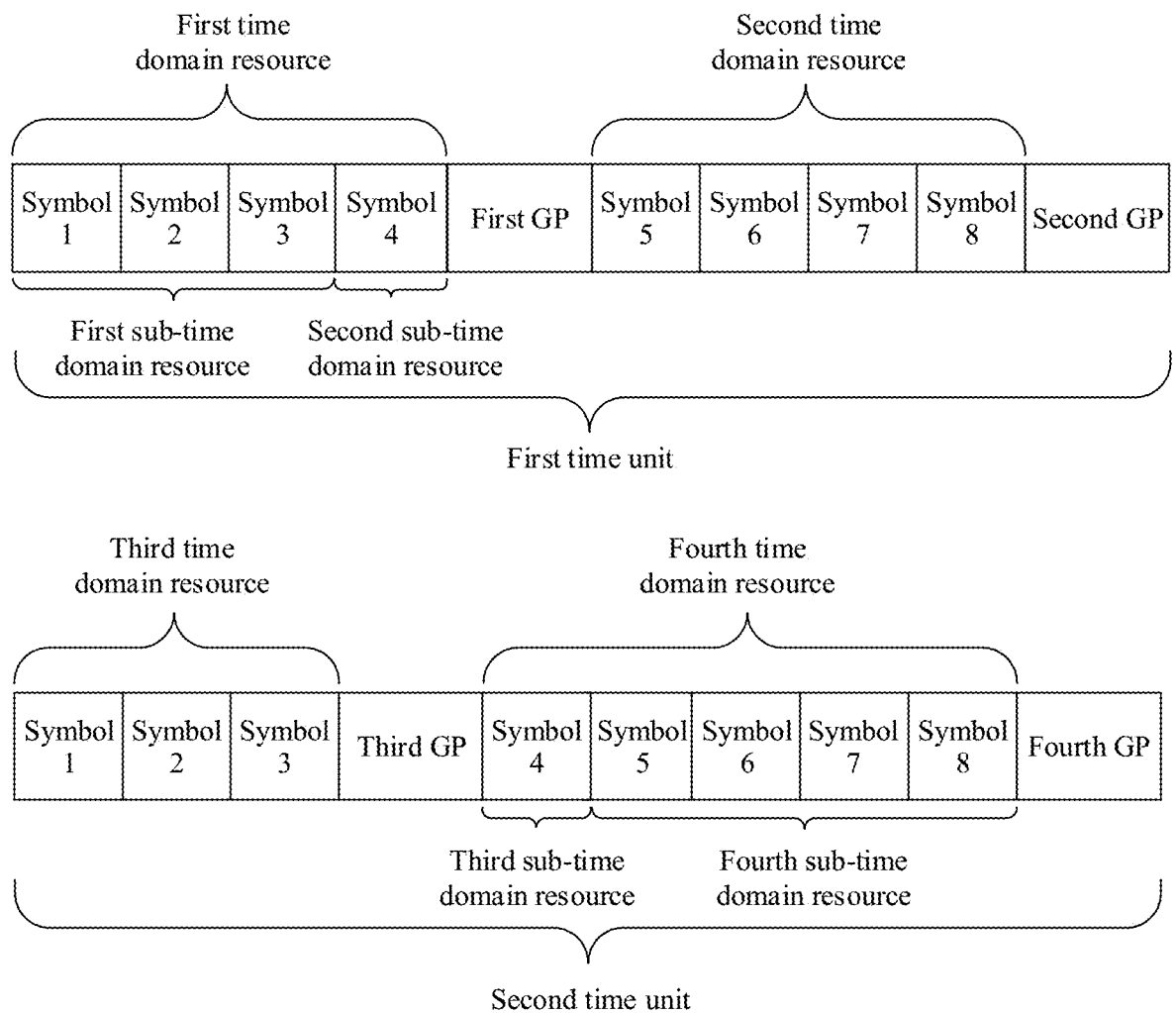
FIG. 4 is a schematic diagram of a structure of another time domain resource unit according to an embodiment of this disclosure.

As shown in FIG. 4, the first time domain resource includes four symbols, the second time domain resource includes four symbols, the third time domain resource includes three symbols, and the fourth time domain resource includes five symbols. The first time domain resource includes a first sub-time domain resource and a second sub-time domain resource, and the fourth time domain resource includes a third sub-time domain resource and a fourth sub-time domain resource. The first sub-time domain resource is located before the second sub-time domain resource in time domain, and the second sub-time domain resource is adjacent to the first guard period, and/or the third sub-time domain resource is located before the fourth sub-time domain resource in time domain, and the third sub-time domain resource is adjacent to the third guard period. Quantities of symbols of the first GP to the fourth GP may be 1. Quantities of symbols of the first time domain resource to the fourth time domain resource, quantities of symbols of the first GP to the fourth GP, and quantities of first sub-time domain resources to fourth sub-time domain resources may be predefined in a standard. Herein, only the quantities of symbols in FIG. 4 is used as an example for description. The quantities of symbols of the first time domain resource to the fourth time domain resource, the quantities of symbols of the first GP to the fourth GP, and the quantities of first sub-time domain resources to fourth sub-time domain resources are not limited in embodiments of this disclosure.

Figure 5:
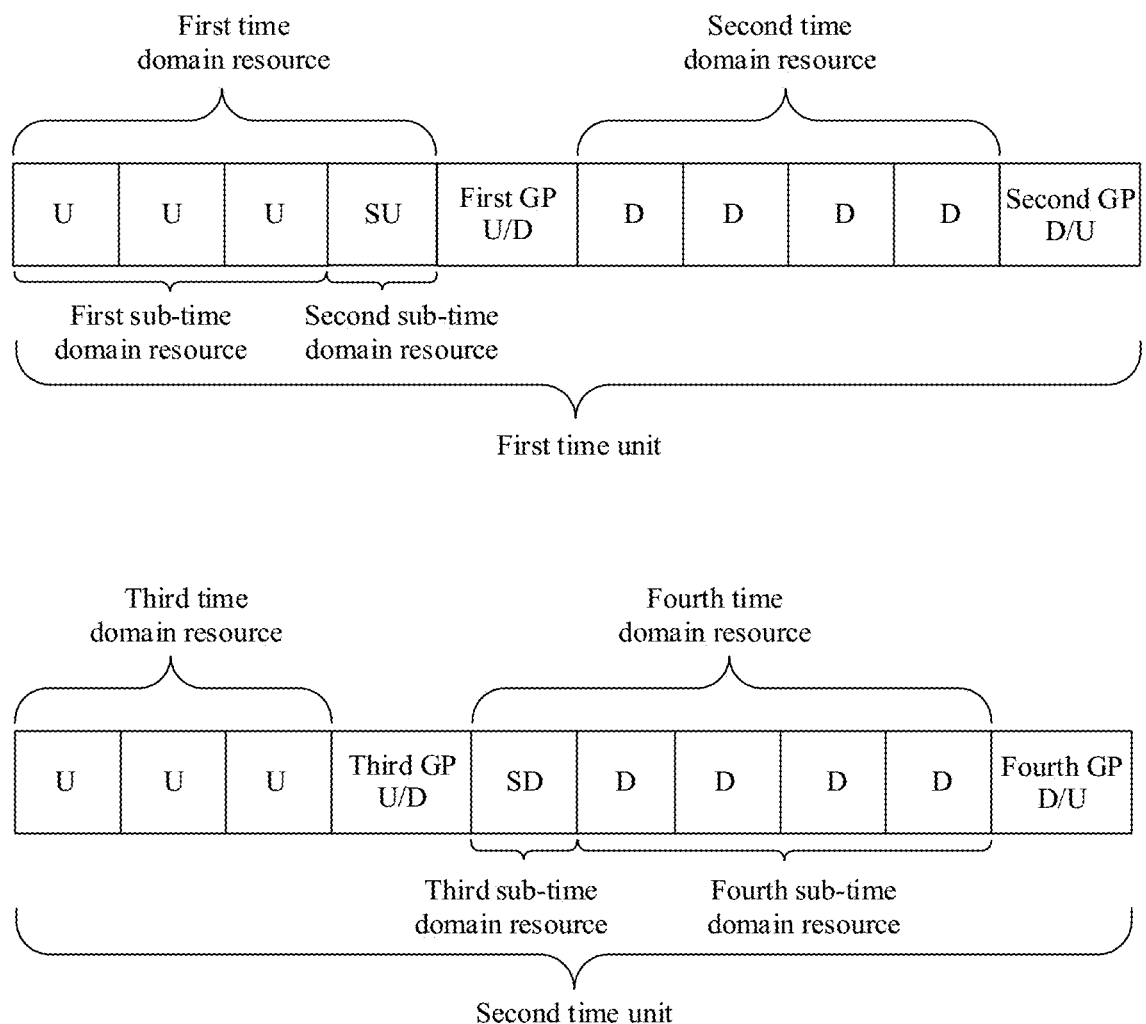
FIG. 5 is a schematic diagram of a structure of another time domain resource unit according to an embodiment of this disclosure.
Figure 6:
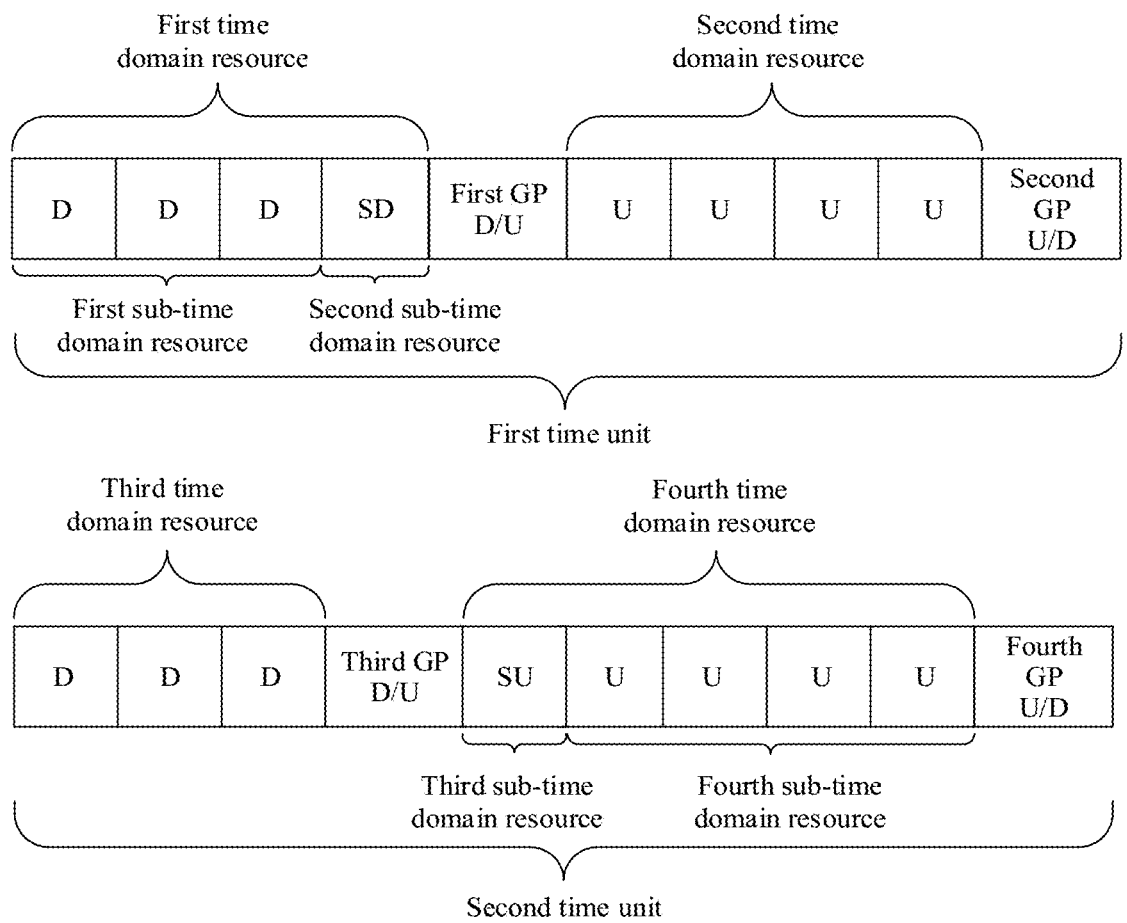
FIG. 6 is a schematic diagram of a structure of another time domain resource unit according to an embodiment of this disclosure.

Further, as shown in FIG. 5 and FIG. 6, a signal is communicated between the master node and the slave node using the first time unit and the second time unit. The second sub-time domain resource is used to communicate the first target signal, the first sub-time domain resource is used to communicate the first signal, and the first target signal is different from the first signal. The third sub-time domain resource is used to communicate the second target signal, the fourth sub-time domain resource is used to communicate the third signal, and the second target signal is different from the third signal. Therefore, the second sub-time domain resource and the third sub-time domain resource may be referred to as special sub-time domain resources. The following uses FIG. 5 as an example for description. In FIG. 5, the second sub-time domain resource occupies one symbol SU that may be referred to as a special uplink transmission symbol. The third sub-time domain resource occupies one symbol SD that may be referred to as a special downlink symbol. The first GP and the third GP are used for uplink-to-downlink conversion, and the second GP and the fourth GP are used for downlink-to-uplink conversion. Further, the first GP and the third GP are used by the master node to perform receive-to-transmit conversion, and used by the slave node to perform transmit-to-receive conversion. The second GP and the fourth GP are used by the master node to perform transmit-to-receive conversion, and used by the slave node to perform receive-to-transmit conversion.

Further, the SU and the SD are used to communicate a target signal. Optionally, the target signal may be higher layer signaling and/or physical layer signaling. Alternatively, the target signal is used for channel quality detection, for example, is a sounding reference signal. Alternatively, the target signal is used for synchronization, for example, is a synchronization signal. Alternatively, the target signal is used for channel estimation, for example, is a demodulation reference signal. Alternatively, the target signal is used for phase tracking. A name of the target signal is not limited herein.

Optionally, the target signal may alternatively carry target data. Target data carried in the first signal and target data carried in the first target signal belong to different services, and target data carried in the third signal and target data carried in the second target signal belong to different services. The different services herein may be different types of services or services of different data packets.

Transmission of the target signal does not occupy a resource of a noise reduction service or another service through division into special symbols, so that transmission stability of the noise reduction service or the other service can be ensured, and service transmission stability can be improved. In addition, special symbols in the first time unit and the second time unit are used to communicate signals in different directions, so that uplink transmission and downlink transmission of the target signal can be ensured.

Optionally, a length of the first sub-time domain resource is the same as a length of the third time domain resource, and a length of the second time domain resource is the same as a length of the fourth sub-time domain resource. In this way, it can be ensured that resources used for uplink transmission and downlink transmission of the noise reduction service or the other service in each time unit are the same, and it can be ensured that a quantity of resources required for the noise reduction service or the other service is stable.

Optionally, a length of the second sub-time domain resource and a length of the third sub-time domain resource each are one symbol. In the first time unit and the second time unit, transmission directions of the target signal are different, for example, uplink transmission and downlink transmission. Only one symbol in each time unit may be used to communicate the target signal. If one symbol is obtained from one time unit through division to communicate the target signal, more resources can be used to communicate the noise reduction service or the other service, so that transmission stability can be improved.

Optionally, when a resource volume of a special symbol in one time unit is insufficient to communicate one target signal, special symbols such as SUs in a plurality of different time units may be jointly used to communicate a same target signal.

The foregoing describes the methods provided in embodiments of this disclosure in detail. The following describes communications devices provided in embodiments of this disclosure in detail. It should be understood that descriptions of the communications device embodiments correspond to the descriptions of the method embodiments. Therefore, for content that is not described in detail, refer to the method embodiments. For brevity, details are not described herein again.

In embodiments of this disclosure, a communications module may be divided into function modules. For example, each function module may be obtained through division based on each corresponding function, or two or more functions may be integrated into one function module. The integrated module may be implemented in a form of hardware, or may be implemented in a form of a software function module. It should be noted that, in this embodiment of this disclosure, division into the modules is an example, and is merely a logical function division. In actual implementation, another division manner may be used.

Figure 7:
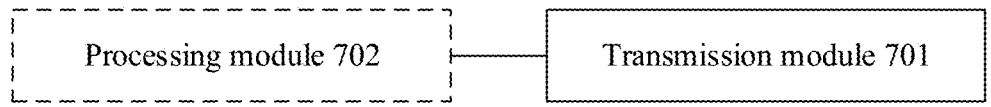
FIG. 7 is a schematic diagram of a structure of a communications device according to an embodiment of this disclosure.

For example, when the function modules of a communications device are obtained through division in an integrated manner, FIG. 7 is a possible schematic diagram of a structure of a communications device (a slave node A) in embodiments of this disclosure. The communications device 7 may include a transmission module 701, and optionally, may further include a processing module 702. The processing module 702 may be configured to perform all operations other than the sending and receiving operations performed by the slave node A in the method embodiments, and/or another process used to support the technology described in this specification. The transmission module 701 may be configured to perform all transmission operations performed by the slave node A in the method embodiments, and/or another process used to support the technology described in this specification. The transmission module may be replaced by a transceiver module, or the transmission module may include an independent sending module and an independent receiving module, and another process used to support the technology described in this specification.

The transmission module 701 is configured to communicate a first signal with a first communications device on a first time domain resource in a first time unit, and is further configured to communicate a second signal with the first communications device on a third time domain resource in a second time unit.

The first time unit and the second time unit have a same time length, the first time unit successively includes, in time domain, the first time domain resource, a first guard period, a second time domain resource, and a second guard period that are consecutive in time domain, and the second time unit successively includes, in time domain, the third time domain resource, a third guard period, a fourth time domain resource, and a fourth guard period that are consecutive in time domain.

In a possible implementation, the first time domain resource and the third time domain resource are used to map signals from the first communications device, and the second time domain resource and the fourth time domain resource are used to map signals sent to the first communications device. Alternatively, the first time domain resource and the third time domain resource are used to map signals sent to the first communications device, and the second time domain resource and the fourth time domain resource are used to map signals from the first communications device.

In a possible implementation, the first time domain resource includes a first sub-time domain resource and a second sub-time domain resource. That the transmission module is configured to communicate a first signal with a first communications device on a first time domain resource in a first time unit includes that the transmission module is configured to communicate the first signal with the first communications device on the first sub-time domain resource.

In a possible implementation, the fourth time domain resource includes a third sub-time domain resource and a fourth sub-time domain resource, and the third sub-time domain resource is used to map a second target signal.

In a possible implementation, the second sub-time domain resource is used to map a first target signal, and the first target signal is different from the first signal, and/or the fourth sub-time domain resource is used to map a third signal, and the second target signal is different from the third signal.

In a possible implementation, a length of the first sub-time domain resource is the same as a length of the third time domain resource, and/or a length of the second time domain resource is the same as a length of the fourth sub-time domain resource.

In a possible implementation, the first sub-time domain resource is located before the second sub-time domain resource in time domain, and the second sub-time domain resource is adjacent to the first guard period, and/or the third sub-time domain resource is located before the fourth sub-time domain resource in time domain, and the third sub-time domain resource is adjacent to the third guard period.

In a possible implementation, the target signal is at least one of higher layer signaling and physical layer signaling. Alternatively, the target signal is used for channel quality detection, synchronization, channel estimation, or phase tracking.

In a possible implementation, target data carried in the first signal and target data carried in the first target signal belong to different services, and/or target data carried in the third signal and target data carried in the second target signal belong to different services In a possible implementation, the target data carried in the first signal and target data carried in the second signal belong to a same service.

In a possible implementation, a length of the second sub-time domain resource and a length of the third sub-time domain resource each are one symbol.

Figure 8:
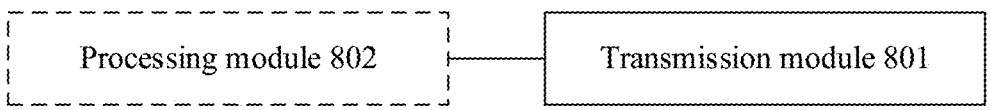
FIG. 8 is a schematic diagram of a structure of another communications device according to an embodiment of this disclosure.

FIG. 8 is a possible schematic diagram of a structure of a communications device (a slave node B) in embodiments of this disclosure. The communications device 8 may include a transmission module 801, and optionally, may further include a processing module 802. The processing module 802 may be configured to perform all operations other than the sending and receiving operations performed by the slave node B in the method embodiments, and/or another process used to support the technology described in this specification. The transmission module 801 may be configured to perform all transmission operations performed by the slave node B in the method embodiments, and/or another process used to support the technology described in this specification. The transmission module may be replaced by a transceiver module, or may include a sending module and a receiving module, and another process used to support the technology described in this specification.

The transmission module 801 is configured to communicate a fourth signal with a first communications device on a second time domain resource in a first time unit, and is further configured to communicate a third signal with the first communications device on a fourth time domain resource in a second time unit, where the first time unit and the second time unit have a same time length, the first time unit successively includes, in time domain, a first time domain resource, a first guard period, the second time domain resource, and a second guard period that are consecutive in time domain, and the second time unit successively includes, in time domain, a third time domain resource, a third guard period, the fourth time domain resource, and a fourth guard period that are consecutive in time domain.

In a possible implementation, the first time domain resource and the third time domain resource are used to map signals from the first communications device, and the second time domain resource and the fourth time domain resource are used to map signals sent to the first communications device. Alternatively, the first time domain resource and the third time domain resource are used to map signals sent to the first communications device, and the second time domain resource and the fourth time domain resource are used to map signals from the first communications device.

In a possible implementation, the fourth time domain resource includes a third sub-time domain resource and a fourth sub-time domain resource. That the transmission module communicates a third signal to the first communications device on a fourth time domain resource in a second time unit includes that the transmission module communicates the third signal to the first communications device on the fourth sub-time domain resource.

In a possible implementation, the first time domain resource includes a first sub-time domain resource and a second sub-time domain resource, and the second sub-time domain resource is used to map a first target signal.

In a possible implementation, the first sub-time domain resource is used to map a first signal, and the first target signal is different from the first signal, and/or the third sub-time domain resource is used to map a second target signal, and the second target signal is different from the third signal.

In a possible implementation, a length of the first sub-time domain resource is the same as a length of the third time domain resource, and/or a length of the second time domain resource is the same as a length of the fourth sub-time domain resource.

In a possible implementation, the first sub-time domain resource is located before the second sub-time domain resource in time domain, and the second sub-time domain resource is adjacent to the first guard period, and/or the third sub-time domain resource is located before the fourth sub-time domain resource in time domain, and the third sub-time domain resource is adjacent to the third guard period.

In a possible implementation, the target signal is at least one of higher layer signaling and physical layer signaling. Alternatively, the target signal is used for channel quality detection, synchronization, channel estimation, or phase tracking.

In a possible implementation, target data carried in the first signal and target data carried in the first target signal belong to different services, and/or target data carried in the third signal and target data carried in the second target signal belong to different services.

In a possible implementation, the target data carried in the third signal and target data carried in the fourth signal belong to a same service.

In a possible implementation, a length of the second sub-time domain resource and a length of the third sub-time domain resource each are one symbol.

Figure 9:
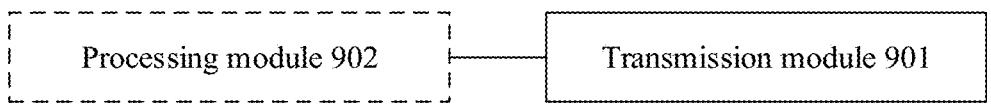
FIG. 9 is a schematic diagram of a structure of another communications device according to an embodiment of this disclosure.

FIG. 9 is a possible schematic diagram of a structure of a communications device (a master node) in embodiments of this disclosure. The communications device 9 may include a transmission module 901, and optionally, may further include a processing module 902. The processing module 902 may be configured to perform all operations other than the sending and receiving operations performed by the master node in the method embodiments, and/or another process used to support the technology described in this specification. The transmission module 901 may be configured to perform all transmission operations performed by the master node in the method embodiments, and/or another process used to support the technology described in this specification. The transmission module may be replaced by a transceiver module, or may include a sending module and a receiving module, and another process used to support the technology described in this specification.

The transmission module 901 is configured to communicate a first signal on a first time domain resource in a first time unit. The transmission module is further configured to communicate a second signal on a third time domain resource in a second time unit. The transmission module is further configured to communicate a fourth signal on a second time domain resource in the first time unit. The transmission module is further configured to communicate a third signal on a fourth time domain resource in the second time unit. The first time unit and the second time unit have a same time length, the first time unit successively includes, in time domain, the first time domain resource, a first guard period, the second time domain resource, and a second guard period that are consecutive in time domain, and the second time unit successively includes, in time domain, the third time domain resource, a third guard period, the fourth time domain resource, and a fourth guard period that are consecutive in time domain.

In a possible implementation, the first time domain resource and the third time domain resource are used to map signals sent by the transmission module, and the second time domain resource and the fourth time domain resource are used to map signals received by the transmission module. Alternatively, the first time domain resource and the third time domain resource are used to map signals received by the transmission module, and the second time domain resource and the fourth time domain resource are used to map signals sent by the transmission module.

In a possible implementation, the first time domain resource includes a first sub-time domain resource and a second sub-time domain resource. That the transmission module is configured to communicate a first signal on a first time domain resource in a first time unit includes that the transmission module is configured to communicate the first signal on the first sub-time domain resource.

In a possible implementation, the fourth time domain resource includes a third sub-time domain resource and a fourth sub-time domain resource. That the transmission module is configured to communicate a third signal on a fourth time domain resource in the second time unit includes that the transmission module is configured to communicate the third signal on the fourth sub-time domain resource.

In a possible implementation, the second sub-time domain resource is used to map a first target signal, and the first target signal is different from the first signal, and/or the third sub-time domain resource is used to map a second target signal, and the second target signal is different from the third signal.

In a possible implementation, a length of the first sub-time domain resource is the same as a length of the third time domain resource, and/or a length of the second time domain resource is the same as a length of the fourth sub-time domain resource.

In a possible implementation, the first sub-time domain resource is located before the second sub-time domain resource in time domain, and the second sub-time domain resource is adjacent to the first guard period, and/or the third sub-time domain resource is located before the fourth sub-time domain resource in time domain, and the third sub-time domain resource is adjacent to the third guard period.

In a possible implementation, the target signal is at least one of higher layer signaling and physical layer signaling. Alternatively, the target signal is used for channel quality detection, synchronization, channel estimation, or phase tracking.

In a possible implementation, target data carried in the first signal and target data carried in the first target signal belong to different services, and/or target data carried in the third signal and target data carried in the second target signal belong to different services.

In a possible implementation, the target data carried in the first signal and target data carried in the second signal belong to a same service, and the target data carried in the third signal and target data carried in the fourth signal belong to a same service.

In a possible implementation, a length of the second sub-time domain resource and a length of the third sub-time domain resource each are one symbol.

Figure 10:
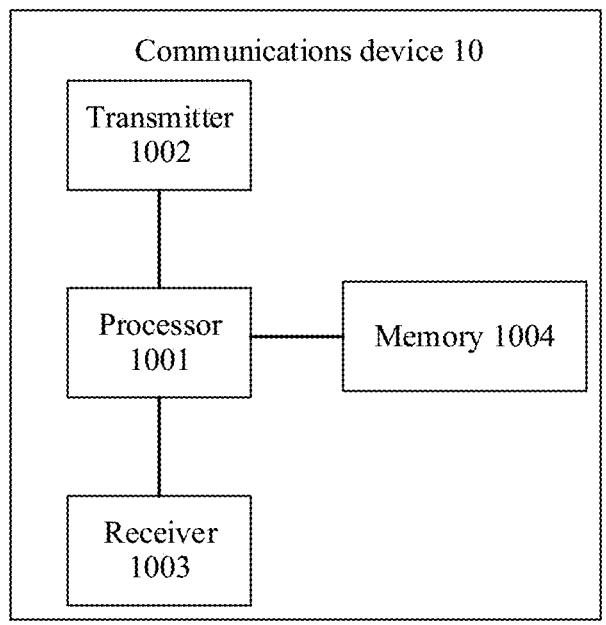
FIG. 10 is a schematic diagram of a structure of another communications device according to an embodiment of this disclosure.

FIG. 10 is possible schematic diagram of another structure of a first communications device, a slave node A, and a slave node B according to an embodiment of this disclosure. The communications device 10 may include at least one processor 1001 and a transmitter 1002. Functions of the at least one processor 1001 and the transmitter 1002 may separately correspond to the specific functions of the processing modules 702 to 902 and the transmission modules 701 to 901 shown in FIG. 7 to FIG. 9. Details are not described herein again. Optionally, the communications device 10 may further include a memory 1004 configured to store program instructions and/or data for the processor 1001 to read.

Figure 11:
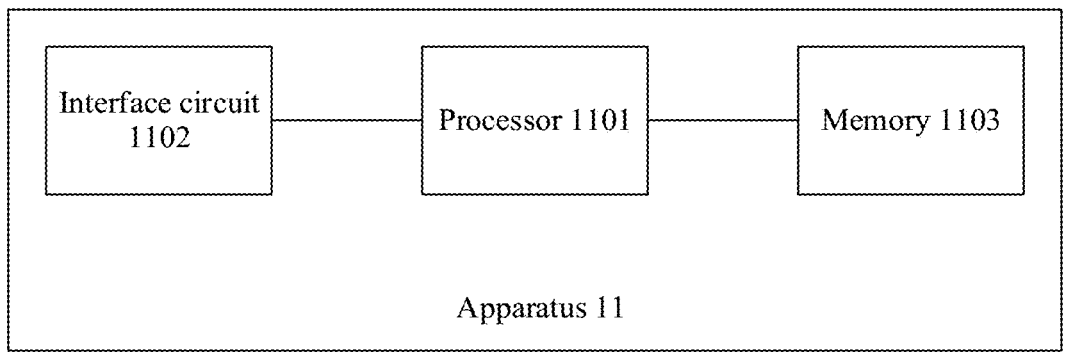
FIG. 11 is a schematic diagram of a structure of a chip according to an embodiment of this disclosure.

FIG. 11 is a schematic diagram of a structure of an apparatus 11 according to an embodiment of this disclosure. The apparatus 11 shown in FIG. 11 may be a master node, a slave node A, or a slave node B, or may be a chip or a circuit that can complete a function of the master node, the slave node A, or the slave node B. For example, the chip or the circuit may be disposed in the master node, the slave node A, or the slave node B. The apparatus 11 shown in FIG. 11 may include at least one processor 1101 and an interface circuit 1102. The processor 1101 implements the steps in the methods provided in the foregoing embodiments. Optionally, the apparatus 11 may further include a memory 1103, and the memory 1103 may be configured to store instructions. The processor 1101 executes the instruction stored in the memory 1103, so that the apparatus 11 implements the steps in the methods provided in the method embodiments.

Further, the processor 1101, the interface circuit 1102, and the memory 1103 may communicate with each other through an internal connection channel, to transfer a control signal and/or a data signal. The memory 1103 is configured to store a computer program. The processor 1101 may invoke the computer program from the memory 1103 and run the computer program, to control the interface circuit 1102 to receive a signal or send a signal, or the processor 1101 invokes the computer program from the memory 1103 using the interface circuit 1102 and runs the computer program, to complete the steps performed by the master node, the slave node A, or the slave node B in the methods embodiments. The memory 1103 may be integrated into the processor 1101, or may be disposed separately from the processor 1101.

Optionally, if the apparatus 11 is a device, the interface circuit 1102 may include a receiver and a transmitter. The receiver and the transmitter may be a same component or different components. When the receiver and the transmitter are a same component, the component may be referred to as a transceiver.

Optionally, if the apparatus 11 is a chip or a circuit, the interface circuit 1102 may include an input interface and an output interface. The input interface and the output interface may be a same interface or different interfaces.

Optionally, if the apparatus 11 is a chip or a circuit, the apparatus 11 may not include the memory 1103. The processor 1101 may read instructions (a program or code) from a memory outside the chip or the circuit, to implement the steps performed by the first apparatus in the method in embodiments.

Optionally, if the apparatus 11 is a chip or a circuit, the apparatus 11 may include a resistor, a capacitor, or another corresponding function component, and the processor 1101 or the interface circuit 1102 may be implemented by the corresponding function component.

In an implementation, a function of the interface circuit 1102 may be implemented using a transceiver circuit or a transceiver-dedicated chip. The processor 1101 may be implemented using a dedicated processing chip, a processing circuit, a processor, or a general-purpose chip.

In another implementation, the first apparatus provided in embodiments of this disclosure may be implemented using a general-purpose computer. To be specific, program code for implementing the functions of the processor 1101 and the interface circuit 1102 is stored in the memory 1103, and the processor 1101 implements the functions of the processor 1101 and the interface circuit 1102 by executing the program code stored in the memory 1103.

Functions and actions of the modules or units in the apparatus 11 listed above are only examples for description. The function units in the apparatus 11 may be configured to perform the actions or the processing processes performed by the master node, the slave node A, or the slave node B in the method embodiments. To avoid repetition, detailed are not described herein.

An embodiment of this disclosure further provides a system, applied to unmanned driving or intelligent driving. The system includes at least one of the master node, the slave node A, or the slave node B in embodiments of this disclosure. The at least one apparatus in the system may be integrated into an entire system or a device, or the at least one apparatus in the system may be independently disposed as an element or an apparatus.

In still another optional manner, when a master node, a slave node A, or a slave node B is implemented using software, all or some of the master node, the slave node A, or the slave node B may be implemented in a form of a computer program product. The computer program product includes one or more computer instructions. When the computer program instructions are loaded and executed on a computer, all or some of the procedures or the functions according to embodiments of this disclosure are implemented. The computer may be a general-purpose computer, a dedicated computer, a computer network, or any other programmable apparatus. The computer instructions may be stored in a computer-readable storage medium or may be communicated from a computer-readable storage medium to another computer-readable storage medium. For example, the computer instructions may be communicated from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible by a computer, or a data storage device, such as a server or a data center, integrating one or more available media. The available medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD)), or the like.

It should be noted that there may be one or more processors included in the master node, the slave node A, or the slave node B configured to perform the communications method provided in embodiments of this disclosure. The one or more processors may be a central processing unit (CPU), a general purpose processor, a digital signal processor (DSP), an application-specific integrated circuit (ASIC), a field-programmable gate array (FPGA), or another programmable logic device, a transistor logic device, a hardware component, or any combination thereof. The processor may implement or execute various example logical blocks, modules, and circuits described with reference to content disclosed in this disclosure. The processor may alternatively be a combination of processors implementing a computing function, for example, a combination of one or more microprocessors, or a combination of the DSP and a microprocessor. Alternatively, if the master node, the slave node A, or the slave node B is a processing apparatus, the processing apparatus may be a CPU, a general purpose processor, a DSP, an ASIC, an FPGA or another programmable logic device, a transistor logic device, a hardware component, or any combination thereof. The processing apparatus may implement or execute various example logical blocks, modules, and circuits described with reference to content disclosed in this disclosure. The processing apparatus may alternatively be a combination of processors implementing a computing function, for example, a combination of one or more microprocessors or a combination of the DSP and a microprocessor.

Method or algorithm steps described in combination with embodiments of this disclosure may be implemented by hardware, or may be implemented by a processor by executing software instructions. The software instructions may include a corresponding software module, and the software module may be stored in a random-access memory (RAM), a flash memory, a read-only memory (ROM), an erasable programmable ROM (EPROM), an electrically EPROM (EEPROM), a register, a hard disk, a removable hard disk, a compact disc (CD) ROM (CD-ROM), or any other form of storage medium well known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in the first apparatus. Certainly, the processor and the storage medium may serve as discrete components in the master node, the slave node A, or the slave node B.

It may be understood that FIG. 7 to FIG. 11 show only simplified designs of the master node, the slave node A, or the slave node B. In an actual application, the master node, the slave node A, or the slave node B may include any quantity of transmitters, receivers, processors, controllers, memories, and other possible elements.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this disclosure, it should be understood that the disclosed apparatus and method may be implemented in other manners. For example, the described apparatus embodiments are only examples. For example, division of the modules or units is only logical function division, and may be other division during actual implementation. For example, a plurality of units or components may be combined or may be integrated into another apparatus, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or another form.

The units described as separate components may or may not be physically separate, and components displayed as units may be one or more physical units, and may be located in one place or may be distributed on different places. Some or all of the units may be selected based on actual requirements to achieve the objectives of the solutions of embodiments.

In addition, function units in embodiments of this disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and sold or used as an independent product, the integrated unit may be stored in a readable storage medium. Based on such an understanding, the technical solutions in embodiments of this disclosure essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in embodiments of this disclosure. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of embodiments of this disclosure, but are not intended to limit the protection scope of embodiments of this disclosure. Any variation or replacement within the technical scope disclosed in this disclosure shall fall within the protection scope of embodiments of this disclosure. Therefore, the protection scope of embodiments of this disclosure shall be subject to the protection scope of the claims.

What is claimed is:

1. A communications method implemented by a first communications device, wherein the communications method comprises:
communicating a first signal on a first time domain resource in a first time unit, wherein the first time unit successively comprises the first time domain resource, a first guard period, a second time domain resource, and a second guard period that are consecutive in a time domain, and wherein the first time domain resource comprises a first sub-time domain resource and a second sub-time domain resource located after the first sub-time domain resource in the time domain and adjacent to the first guard period;
communicating a second signal on a third time domain resource in a second time unit, wherein the first time unit and the second time unit comprise a same time length, wherein the second time unit successively comprises the third time domain resource, a third guard period, a fourth time domain resource, and a fourth guard period that are consecutive in the time domain;
communicating a fourth signal on the second time domain resource; and
communicating a third signal on a on the fourth time domain resource.

2. The communications method of claim 1, wherein the first time domain resource and the third time domain resource map signals sent by the first communications device, and the second time domain resource and the fourth time domain resource map signals received by the first communications device; or
wherein the first time domain resource and the third time domain resource map signals received by the first communications device, and the second time domain resource and the fourth time domain resource map signals sent by the first communications device.

3. The communications method of claim 1, further comprising communicating the first signal on the first sub-time domain resource.

4. The communications method of claim 3, wherein the fourth time domain resource comprises a third sub-time domain resource and a fourth sub-time domain resource, and wherein the communications method further comprises communicating the third signal on the fourth sub-time domain resource.

5. The communications method of claim 4, wherein the second sub-time domain resource map a first target signal that is different from the first signal, or wherein the third sub-time domain resource map a second target signal that is different from the third signal.

6. The communications method of claim 4, wherein a first length of the first sub-time domain resource is the same as a third length of the third time domain resource, or wherein a second length of the second time domain resource is the same as a fourth length of the fourth sub-time domain resource.

7. The communications method of claim 4, wherein the third sub-time domain resource is located before the fourth sub-time domain resource in the time domain and is adjacent to the third guard period.

8. The communications method of claim 5, wherein each of the first target signal and the second target signal is higher layer signaling, physical layer signaling, or used for channel quality detection, synchronization, channel estimation, or phase tracking.

9. The communications method of claim 1, wherein first target data carried in the first signal and second target data carried in the second signal belong to a first service, and wherein third target data carried in the third signal and fourth target data carried in the fourth signal belong to a second service.

10. The communications method of claim 4, wherein a first length of the first sub-time domain resource is the same as a third length of the third time domain resource, and wherein a second length of the second time domain resource is the same as a fourth length of the fourth sub-time domain resource.

11. The communications method of claim 4, wherein the second sub-time domain resource is located after the first sub-time domain resource in the time domain and is adjacent to the first guard period, and wherein the third sub-time domain resource is located before the fourth sub-time domain resource in the time domain and is adjacent to the third guard period.

12. A first communication device comprising:
a memory configured to store instructions; and
a processor coupled to the memory and configured to execute the instructions to cause the first communication device to:
communicate a first signal on a first time domain resource in a first time unit, wherein the first time unit successively comprises the first time domain resource, a first guard period, a second time domain resource, and a second guard period that are consecutive in a time domain, and wherein the first time domain resource comprises a first sub-time domain resource and a second sub-time domain resource located after the first sub-time domain resource in the time domain and adjacent to the first guard period;
communicate a second signal on a third time domain resource in a second time unit, wherein the first time unit and the second time unit comprises a same time length, and wherein the second time unit successively comprises the third time domain resource, a third guard period, a fourth time domain resource, and a fourth guard period that are consecutive in the time domain;
communicate a fourth signal on the second time domain resource; and
communicate a third signal on the fourth time domain resource.

13. The first communication device of claim 12, wherein the first time domain resource and the third time domain resource map signals sent by the first communication device, and the second time domain resource and the fourth time domain resource map signals received by the first communication device; or
wherein the first time domain resource and the third time domain resource map signals received by the first communication device and the second time domain resource and the fourth time domain resource map signals sent by the first communication device.

14. The first communication device of claim 12, wherein the processor is further configured to execute the instructions to cause the first communication device to further communicate the first signal on the first sub-time domain resource.

15. The first communication device of claim 14, wherein the fourth time domain resource comprises a third sub-time domain resource and a fourth sub-time domain resource, and wherein the processor is further configured to execute the instructions to cause the first communication device to further communicate the third signal on the fourth sub-time domain resource.

16. The first communication of claim 15, wherein the second sub-time domain resource map a first target signal that is different from the first signal, or wherein the third sub-time domain resource map a second target signal that is different from the third signal.

17. The first communication device of claim 15, wherein a first length of the first sub-time domain resource is the same as a third length of the third time domain resource, or wherein a second length of the second time domain resource is the same as a fourth length of the fourth sub-time domain resource.

18. The first communication device of claim 15, wherein the third sub-time domain resource is located before the fourth sub-time domain resource in the time domain and is adjacent to the third guard period.

19. The first communication device of claim 16, wherein each of the first target signal and the second target signal is higher layer signaling, physical layer signaling or used for channel quality detection, synchronization, channel estimation, or phase tracking.

20. The first communication device of claim 12, wherein first target data carried in the first signal and second target data carried in the second signal belong to a first service, and wherein third target data carried in the third signal and fourth target data carried in the fourth signal belong to a second service.

21. The first communication device of claim 15, wherein a first length of the first sub-time domain resource is the same as a third length of the third time domain resource, and wherein a second length of the second time domain resource is the same as a fourth length of the fourth sub-time domain resource.

* * * * *

UNITED STATES PATENT AND TRADEMARK OFFICE
CERTIFICATE OF CORRECTION

PATENT NO. : 12,225,513 B2
APPLICATION NO. : 17/890719
DATED : February 11, 2025
INVENTOR(S) : Lei Gao et al.

It is certified that error appears in the above-identified patent and that said Letters Patent is hereby corrected as shown below:

In the Claims

Claim 1, Column 28, Line 49: "length, wherein the second time unit successively com-" should read "length, and wherein the second time unit successively com-"

Claim 1, Column 28, Line 55: "communicating a third signal on a on the fourth time" should read "communicating a third signal on the fourth time"

Claim 5, Column 29, Line 11: "second sub-time domain resource map a first target signal" should read "second sub-time domain resource maps a first target signal"

Claim 5, Column 29, Line 13: "sub-time domain resource map a second target signal that is" should read "sub-time domain resource maps a second target signal that is"

Claim 16, Column 30, Line 33: "The first communication of claim 15, wherein the" should read "The first communication device of claim 15, wherein the"

Claim 16, Column 30, Line 34: "second sub-time domain resource map a first target signal" should read "second sub-time domain resource maps a first target signal"

Claim 16, Column 30, Line 36: "sub-time domain resource map a second target signal that is" should read "sub-time domain resource maps a second target signal that is"

Signed and Sealed this
Fifteenth Day of April, 2025

Coke Morgan Stewart
*Acting Director of the United States Patent and Trademark Office*